(12) United States Patent
Noumi et al.

(10) Patent No.: US 7,704,597 B2
(45) Date of Patent: Apr. 27, 2010

(54) POROUS FILM

(75) Inventors: Shunsuke Noumi, Ibaraki (JP); Yutaka Yamamura, Ibaraki (JP); Seiryu Nakayama, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 894 days.

(21) Appl. No.: 10/962,429

(22) Filed: Oct. 13, 2004

(65) Prior Publication Data
US 2006/0078722 A1     Apr. 13, 2006

(51) Int. Cl.
*B32B 3/26* (2006.01)
*C08J 9/28* (2006.01)

(52) U.S. Cl. ............. 428/304.4; 428/315.5; 428/315.7; 428/317.9; 521/61; 521/64

(58) Field of Classification Search ............. 428/304.4, 428/317.9, 315.7; 521/61, 64
See application file for complete search history.

(56) References Cited

U.S. PATENT DOCUMENTS 6,716,553 B1 *  4/2004  Fujita et al. ................ 429/145
2004/0080068 A1 *  4/2004  Ooizumi et al. ............... 264/41
2004/0131837 A1 *  7/2004  Yamamoto et al. ........ 428/304.4

FOREIGN PATENT DOCUMENTS

CN           1498744 A       5/2004
WO    WO 0068305 A1 *     11/2000

OTHER PUBLICATIONS

Translation of JP 2001-059036, Yamamoto et al, "Porous Film", Mar. 6, 2001.*
Chinese Office Action dated May 8, 2009.

* cited by examiner

*Primary Examiner*—Hai Vo
(74) *Attorney, Agent, or Firm*—Sughrue Mion, PLLC

(57) ABSTRACT

A porous film which has a crosslinked structure and, due to this structure, has excellent resistance to film breakage at high temperatures and excellent transverse-direction shape retention even at high temperatures, uses of the film are provided. The porous film comprises a crosslinked material of a resin composition containing a polyolefin. The film has a peak of shrinkage force in a transverse direction (TD) at a temperature region of the shutdown temperature or higher of the film, and the shrinkage force as measured at the peak being 80 $N/cm^2$ or lower.

10 Claims, 2 Drawing Sheets

POROUS FILM

FIELD OF THE INVENTION

The present invention relates to a porous film comprising a crosslinked material of a resin composition containing a polyolefin, and to uses of the film. More particularly, the invention relates to a porous film having a small shrinkage force in transverse direction, and to a cell, capacitor, etc., each using the porous film.

DESCRIPTION OF THE RELATED ART

Non-aqueous electrolyte cells in which ions of a light metal such as lithium are used for electrode reactions have a high energy density and is reduced in self-discharge. Because of this, the range of uses of these cells has been greatly expanding with the trend toward performance advancement, size reduction, etc., in electronic appliances. The constitution of such non-aqueous electrolyte cells which is mainly used is a spirally wound structure formed by superposing a positive electrode, negative electrode, and separator each in a strip form and winding the assemblage. This spirally wound constitution secures a large effective electrode area. The separator basically functions not only to prevent short-circuiting between the two electrodes but also to allow ions to pass therethrough due to its porous structure and thereby enable cell reactions. From the standpoint of improvement in safety, however, a separator having the so-called shutdown function (SD function) is used. The shutdown function is a function in which when an abnormal current occurs as a result of, e.g., a connection error, then the resin thermally deforms with increasing temperature in the cell and thus close up the pores to stop the cell reactions. Conventional separators having such SD function include, for example, porous films made of polyethylene and porous films having a multilayer structure comprising polyethylene and polypropylene.

In addition, applications of the non-aqueous electrolyte cells are spreading remarkably in recent years and it has become necessary to assume various dangerous situations in designing cells. Severe requirements are prescribed, which include as a measure of safety, the property of not readily coming into a non-steady state, e.g., smoking, even when the cell is exposed to, e.g., a high temperature of 150° C. In case where short-circuiting between the two electrodes inside occurs simultaneously with such an abnormal increase in temperature, the energy which has accumulated is released instantaneously. This situation is hence highly dangerous.

There are no bounds of cell capacity increase in recent years and the amount of energy accumulated is becoming larger. It is therefore highly important that even when an abnormal temperature increase occurs, the separator should retain its shape and still retain its property of electrically insulating the two electrodes of the cell or capacitor. For constituting a non-aqueous electrolyte cell, use may be made of a technique in which sheet-form electrodes and separators are stacked alternately. In general, however, a spirally wound structure which is formed by superposing a positive electrode, negative electrode, and separator each in a strip form and winding the assemblage and which retains a large effective electrode area is being mainly used as stated above from the standpoint of production efficiency. In this constitution, the separator has a higher degree of freedom of deformation in the transverse direction (TD) than in the machine direction (MD). Consequently, in order for the separator incorporated in a cell to retain its shape, the retention of the TD shape is more important.

For example, JP-A-11-322989 discloses a technique for increasing the safety of a cell employing a porous polyolefin film at temperatures not higher than the pore closure temperature of the film by regulating the film so as to have a specific value of the upper limit of the maximum TD shrinkage stress and/or maximum degree of TD shrinkage at temperatures not higher than the pore closure temperature. This porous film is not of the type having a crosslinked structure which is for heat resistance improvement, and cell safety at temperatures higher than the pore closure temperature is not taken into account. However, cases have been reported in which even after the occurrence of pore closure (shutdown), the cell temperature continues to rise due to a run-away reaction. It is of urgent necessity to maintain safety at temperatures not lower than the SD temperature.

On the other hand, there are cases where use of porous polyolefin films encounters the phenomenon called meltdown at a temperature not lower than the melting point of the constituent resin. In this phenomenon, the resin melts and comes to have a reduced strength or flow, resulting in film breakage. The function of electrical insulation is thus lost. Because of this, for improving cell safety at high temperatures, it is necessary to inhibit film breakage at high temperatures without fail.

Under these circumstances, the present inventors invented a technique for crosslinking a porous film by a novel method and succeeded in developing a porous film having high strength and high heat resistance (see International Publication WO 01/016219). This crosslinking technique eliminated the problem of film breakage caused by, e.g., melting at high temperatures.

However, the following has been found. The porous film having a crosslinked structure as described above retains the film structure even at temperatures higher than the pore closure temperature. As a result, the TD shrinkage force of the film is maximal in that temperature range and this is causative of electrode short-circuiting when the cell is exposed to high temperatures.

To sum up, the porous films for use as separators or the like in cells or the like have the possibility of posing two problems when the cells or the like are heated to a high temperature, i.e., internal short-circuiting caused by TD shrinkage and internal short-circuiting caused by film breakage due to melting or the like. It has been necessary to overcome these two problems.

SUMMARY OF THE INVENTION

Accordingly, one object of the present invention is to provide a porous film which has a crosslinked structure and which, due to the structure, has excellent resistance to film breakage at high temperatures and further has excellent shape retention in transverse direction even at high temperatures.

Another object of the present invention is to provide uses of the porous film.

The present inventors made intensive investigations in order to accomplish those objects. As a result, it has been found that the TD shrinkage force of a porous film has a peak at a temperature not lower than the shutdown temperature of the film and the peak value closely correlates with the high-temperature safety of the cell. Specifically, it has been found that when a crosslinked porous film has a TD shrinkage force reduced to 80 N/cm$^2$ or lower, the film neither breaks nor short-circuits in at least 10 minutes in a 150° C. hot-box test. The present invention has been completed based on this finding.

The present invention provides a porous film comprising a crosslinked material of a resin composition comprising a polyolefin, the film having a peak of shrinkage force in a transverse direction (TD) at a temperature region of the shutdown temperature or higher of the film, and the shrinkage force as measured at the peak being 80 N/cm² or lower. A porous film having a crosslinked structure and hence having excellent resistance to film breakage at high temperatures is regulated so as to have a TD shrinkage force within that range. As a result, the porous film has excellent shape retention in transverse direction even at high temperatures, and the cell employing this porous film can be prevented from suffering, e.g., internal short-circuiting at high temperatures, and can hence be safer. Values of various properties in the present invention were found values obtained by the measurement methods which will be described in the Examples.

The porous film preferably is one which after 1-hour heating at 120° C. has degrees of shrinkage satisfying the relationship: degree of machine direction (MD) shrinkage<degree of transverse direction (TD) shrinkage. Since this porous film has such properties inherent in biaxial stretching, it has satisfactory strength in each of the two directions.

The porous film preferably has a penetration strength of 3 N/25 μm or higher. This porous film has excellent resistance to film breakage at high temperatures besides high temperature heat resistance.

The resin composition preferably comprises 1-50% by weight of a polymer having double bonds and 1-50% by weight of at least one resin component selected from the group consisting of polyolefins having a weight average molecular weight of 500,000 or lower, thermoplastic elastomers, and graft copolymers. Use of the polymer having double bonds facilitates the formation of a crosslinked structure. Use of this polymer in combination with the other component described above enables the porous film to perform its shutdown function at relatively low temperatures.

Furthermore, the resin composition preferably contains ultrahigh molecular polyethylene having a weight average molecular weight of 1,000,000 or higher. Use of the ultrahigh molecular polyethylene not only enables higher strength to be obtained with higher certainty due to a stretching effect in imparting porosity, but also is advantageous for a crosslinking reaction for heat resistance improvement.

Moreover, the polymer having double bonds preferably is a resin which has double bonds each having a hydrogen atom bonded to the a position carbon atom. This resin preferably is at least one member selected from the group consisting of polynorbornene, polybutadiene, polyisoprene, and EPDM. Use of these resin components enables a crosslinking reaction for improving heat resistance to proceed satisfactorily.

The present invention further provides a film for maintaining electrical insulation (including a separator for non-aqueous electrolyte cells) which comprises the porous film described above. The porous film constituting this film for electrical insulation has excellent resistance to film breakage at high temperatures and excellent shape retention in transverse direction even at high temperatures due to the crosslinked structure. Because of this, the film for electrical insulation retains its electrical insulating properties at high temperatures and prevents short-circuiting. Consequently, high safety can be secured.

In particular, a separator for non-aqueous electrolyte cells which is a separator for lithium ion secondary cells and does not suffer short-circuit breakage in at least 10 minutes in a 150° C. hot-box test brings about excellent high temperature safety.

The present invention further provides a cell which employs the porous film described above as a film for maintaining electrical insulation. When this cell is a lithium ion cell, the present invention is especially effective.

The present invention still further provides a capacitor which employs the porous film described above as a film for maintaining electrical insulation.

DETAILED DESCRIPTION OF THE INVENTION

Figure 1:
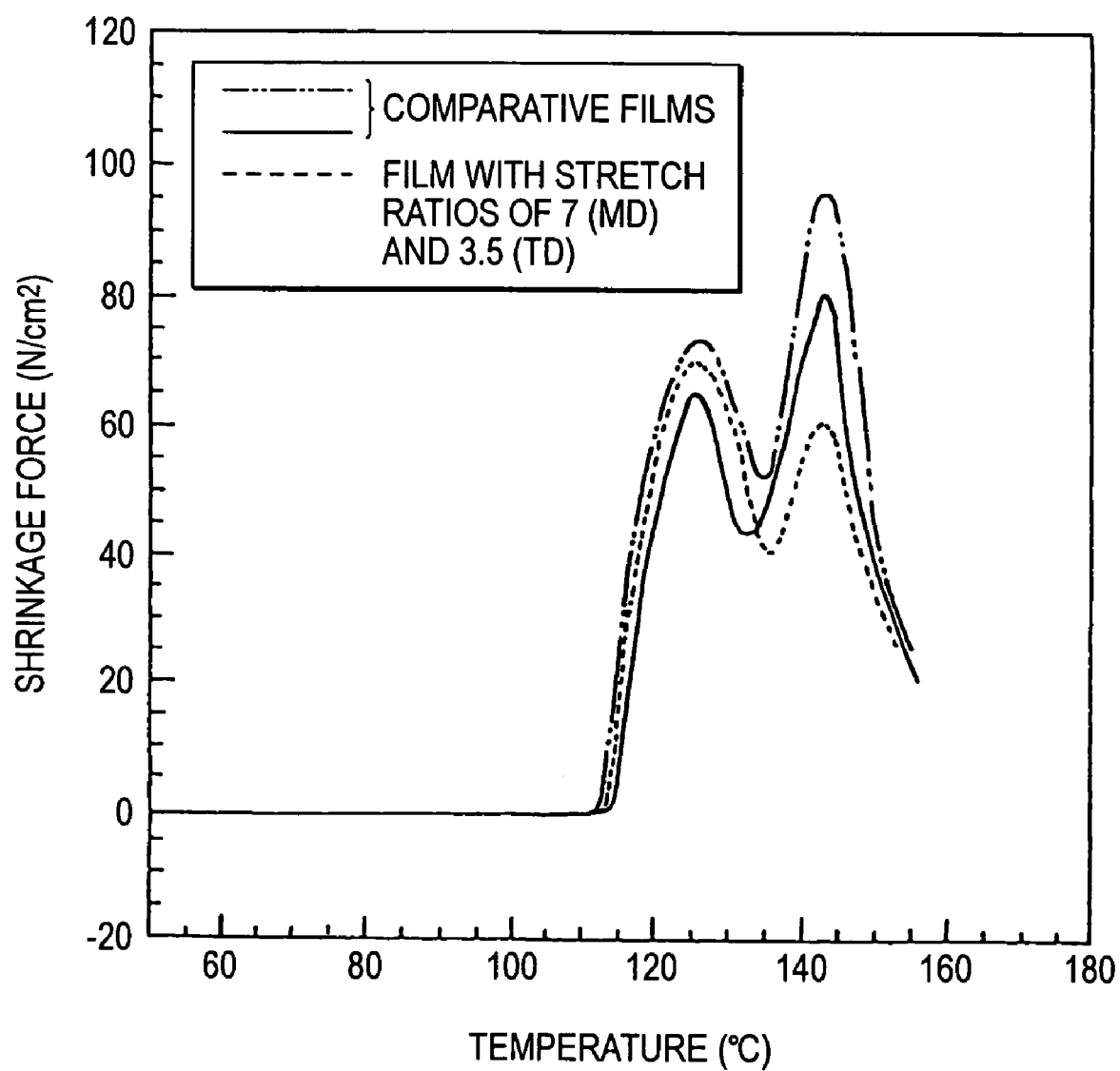
FIG. 1 is a graphic presentation showing the results of a measurement of the TD shrinkage forces of porous films differing in MD and TD stretch ratios.

The present invention is described in detail below.

The porous film of the present invention comprises a crosslinked material of a resin composition comprising a polyolefin. Preferably, the resin composition comprises a polymer having double bonds and at least one resin component selected from the group consisting of polyolefins having a weight average molecular weight of 500,000 or lower, thermoplastic elastomers, and graft copolymers.

The polymer having double bonds (hereinafter referred to also as "first resin component") is one having double bonds in the main chain and/or side chains of the polymer. Part of the original double bonds may disappear as a result of the addition of hydrogen, a halogen, etc., or the polymer may be a derivative formed by displacing part of the hydrogen atoms of the double bonds by other substituents.

The polymer preferably is one in which hydrogen atoms are bonded to the α-position carbon atoms of double bonds. Examples of the polymer include polynorbornene, polybutadiene, polyisoprene, natural rubber, acrylonitrile/butadiene rubbers, styrene/butadiene rubbers, EPDM (ethylene/propylene/diene terpolymers), and polychloroprene. Such polymers may be ones in which part of the double bonds have been modified, as stated above. A mixture of two or more of such polymers may also be used. Of those, polynorbornene, polybutadiene, and EPDM are more preferred used from the standpoints of availability and dispersibility of a raw material.

More specifically, the polybutadiene preferably is one having a large proportion of cis-form 1,4-polybutadiene skeletons because this polybutadiene is apt to have a flexible structure and the reaction of the double bonds is apt to proceed. The proportion of the cis-form 1,4-polybutadiene skeletons is preferably 30% or higher from the standpoint of enabling the crosslinking reaction to proceed satisfactorily. The EPDM preferably is of the kind produced from starting materials including ethylidene norbornene, which has excellent copolymerizability, and especially preferably is one having a large amount of residual double bonds.

For the porous film of the present invention, at least one resin component (hereinafter referred to as "second resin component") selected from the group consisting of polyolefins having a weight average molecular weight of 500,000 or lower, thermoplastic elastomers, and graft copolymers is preferably used. Examples of the polyolefins having a weight average molecular weight of 500,000 or lower include polyolefin resins such as polyethylene or polypropylene, and modified polyolefin resins such as ethylene/acrylic monomer copolymers or ethylene/vinyl acetate copolymers.

Examples of the thermoplastic elastomers include thermoplastic polystyrene, polyolefin, polydiene, vinyl chloride, and polyester elastomers.

Examples of the graft copolymers include graft copolymers comprising a polyolefin as the main chain and a vinyl polymer having an incompatible group as side chains. Of those, polyacrylics, polymethacrylics, polystyrene, polyacrylonitrile, and polyoxyalkylenes are preferred. The term "incompatible group" as used here means a group which is incompatible with polyolefins, and examples thereof include groups derived from vinyl polymers.

Those resins may be used alone or in combination of two or more thereof. Of those resins, preferable resins are polyolefin resins having a weight average molecular weight of 500,000 or lower, in particular, polyethylene having a low melting point and polyolefin elastomers having crystallinity, and graft copolymers which have polymethacrylics as side chains and have a low melting temperature, because these resins bring about a low shutdown temperature.

To increase the strength of the porous film, it is preferred to further incorporate an ultrahigh molecular polyolefin resin having a weight average molecular weight exceeding 500,000, such as ultrahigh molecular polyethylene especially having a weight average molecular weight of 1,000,000 or higher. Namely, the porous film of the present invention comprises a resin composition which comprises the first and second resin components and optionally further comprises an ultrahigh molecular polyolefin resin having a weight average molecular weight exceeding 500,000.

In the present invention, the amount of the polymer having double bonds to be incorporated is in the range of, for example, 1-50% by weight, preferably 1-40% by weight, more preferably 1-35% by weight, based on the resin composition. The lower limit of the amount thereof is 1% by weight from the standpoint of obtaining a porous film having sufficient heat resistance. The upper limit thereof is 50% by weight from the standpoint of enabling the porous film to retain the properties required of a separator for cells.

The amount of the second resin component to be incorporated is in the range of, for example, 1-50% by weight, preferably 5-45% by weight, more preferably 5-40% by weight, based on the resin composition. The lower limit of the amount thereof is 1% by weight from the standpoint of obtaining a sufficient SD temperature. The upper limit thereof is 50% by weight from the standpoint of enabling the porous film to have a sufficient porosity and retain the properties required of a separator for cells.

The amount of the ultrahigh-molecular polyolefin resin having a weight-average molecular weight exceeding 500,000 which is to be incorporated is preferably 5-98% by weight, more preferably 10-90% by weight, based on the resin composition.

A process for producing the porous film according to the present invention will be explained.

For producing the porous film according to the present invention, conventional techniques concerning wet film formation processes can be utilized. For example, the porous film can be produced by mixing the resin composition with a solvent, kneading and thermally melting the mixture, simultaneously forming the melt into a sheet, rolling the sheet, stretching the sheet at least uniaxially, and removing the solvent with heating.

Examples of the solvent include aliphatic or cyclic hydrocarbons such as nonane, decane, undecane, dodecane, decalin or liquid paraffin, and mineral oil fractions having boiling points corresponding to those of these hydrocarbons. Preferred of these are nonvolatile solvents containing a large proportion of alicyclic hydrocarbons, such as liquid paraffin. The amount of the solvent to be used is preferably 70-95% by weight, more preferably 70-90% by weight, and most preferably 75-90% by weight. The reason for this is as follows. Where the amount of the solvent is 70% by weight or more, kneading torque, rolling and stretching stress are moderate, whereby productivity is excellent. Where the amount of the solvent is 95% by weight or less, neck-in does not occur at die outlet in extruding, and this facilitates molding. The step of kneading a mixture of the resin composition and a solvent and forming the mixture into a sheet can be conducted by conventional method. A method may be used in which the mixture is batchwise kneaded with a Banbury mixer, kneader, or the like and then sandwiched between cooled metal plates to thereby cool it and obtain a sheet-form molding through rapid-cooling crystallization; or a method in which a sheet-form molding is obtained with, e.g., an extruder equipped with a T-die or the like. Although the kneading may be conducted under appropriate temperature conditions without particular limitations, it is preferably conducted at 100-200° C. The thickness of the sheet-form molding thus obtained is not particularly limited. However, the thickness thereof is preferably 3-20 mm, and may be regulated to 0.5-3 mm by a rolling treatment, e.g., hot pressing. Methods for the hot pressing are not particularly limited, and the belt press described in JP-A-2000-230072 can, for example, be advantageously used. The temperature for the rolling treatment is preferably 100-140° C.

Methods for stretching the sheet-form molding are not particularly limited, and the ordinary tenter method, roll method, inflation method or a combination of two or more of these may be used. Other known stretching techniques can also be used. In the case of biaxial stretching, it may be either simultaneous stretching or successive stretching with respect to stretching in the machine and transverse directions. From the standpoint of the evenness and strength of the film, it is preferred to form a film through simultaneous biaxial stretching. The temperature for the stretching is preferably 100-140° C.

The porous film of the present invention is characterized in that the transverse-direction (TD) shrinkage force of the film has a peak in a range of temperatures not lower than the shutdown temperature of the film and the shrinkage force as measured at the peak is 80 $N/cm^2$ or lower. The reason why the porous film has such a shrinkage force at a temperature not lower than the crystal melting point may be thought that the residual stress resulting from stretching is released as a result of crystal melting. It was hence found that the TD shrinkage force as measured at temperatures not lower than the crystal melting point can be reduced by imparting MD orientation in order to lower the proportion of crystals oriented in the TD. In a process for MD orientation, a single step or a combination of two or more steps can be used for regulating the orientation.

For example, the following techniques may be used. In the step of extrusion with a die after kneading, there is a flow in the MD. Expedients for diminishing this flow have hitherto been employed, which include use of a fishtail type die which forms transverse-direction flows within the die. However, for attaining MD orientation, it is advantageous to use, for example, a flat die through which the material is extruded merely in the MD.

In a rolling/stretching step also, MD orientation can be imparted by regulating the proportion of MD stretch ratio to TD stretch ratio. For example, regulating the MD stretch ratio so as to be higher than the TD stretch ratio is advantageous for MD orientation. In the invention, the MD stretch ratio/TD stretch ratio in the stretching step, in particular, is preferably 1.0-3.5, more preferably 1.1-3.0, although it depends on the degree of MD orientation in the extrusion step or rolling step.

A film produced through dry uniaxial stretching meets the purpose because it has not undergone TD stretching. However, this film is apt to tear and has low strength. An effective process hence comprises forming a film through biaxial stretching so as to heighten MD orientation while maintaining high strength. Consequently, the TD stretch ratio in the stretching step is preferably 2-6.

It is preferred that the degree of TD shrinkage through 1-hour heating at 120° C., which is not higher than the shutdown temperature, be higher than the degree of MD shrinkage through the heating. This is attained due to properties obtained by such orientation. The film thus regulated can be clearly distinguished from uniaxially stretched films, which have insufficient strength.

The solvent removal treatment is a step in which the solvent is removed from the sheet-form molding to thereby form a porous structure. As long as the solvent can be removed, methods for this step are not particularly limited. For example, the removal of the residual solvent can be accomplished by cleaning the sheet-form molding with a solvent. Examples of the solvent for removal include readily volatile solvents such as hydrocarbons such as pentane, hexane, heptane or decane, chlorohydrocarbons such as methylene chloride or carbon tetrachloride, fluorohydrocarbons such as trifluoroethane, ethers such as diethyl ether or dioxane, alcohols such as methanol or ethanol, and ketones such as acetone or methyl ethyl ketone. These may be used alone or as a mixture of two or more thereof. Methods for cleaning with such a solvent are not particularly limited, and examples thereof include a method in which the sheet-form molding is immersed in the solvent to thereby extract the residual solvent and a method in which the solvent is showered on the sheet-form molding.

After having been obtained through film formation from the resin composition by any of those known methods, the porous film is preferably subjected to a crosslinking treatment with at least one member selected from the group consisting of heat, ultraviolet, electron rays, and visible light, whereby the double bonds of the polybutadiene or the like are wholly or partly eliminated. Of those, desirable crosslinking treatment is one with heat or ultraviolet from the standpoint of the structural stability of the porous film. The heat treatments greatly improve the high-temperature heat resistance (resistance to film breakage) of the porous film.

Although the reasons for the improvement in heat resistance have not been fully elucidated, it is thought that polymer radicals generated in each treatment add to double bonds and this results in a crosslinking reaction of the polymer having double bonds with itself or with another resin component. It is also thought that the glass transition temperature of the polymer chain itself has considerably increased due to the disappearance of double bonds in the main chain and this also is attributable to the improvement in heat resistance. Although the proportion of double bonds to be eliminated is suitably selected in view of the desired heat resistance, it is preferred to eliminate 80-100% of the double bonds (the proportion of double bonds which have been eliminated is calculated from IR peak sizes). The elimination of double bonds is thought to greatly improve heat resistance.

In the case where heat is used as an energy for the crosslinking treatment, use may be made of either a one-stage heat treatment method in which a heat treatment is carried out in one step or a multistage heat treatment method in which the porous film is heat-treated first at a low temperature and then at a high temperature. Alternatively, a temperature-rising heat treatment method may be used in which the porous film is heat-treated while elevating the temperature. It is, however, desirable to treat the porous film in such a manner as not to impair original properties of the porous film, such as air permeability. In the case of the one-stage heat treatment, it is preferred to use a temperature of 40-140° C. although it varies depending on the composition of the porous film. In the case where heat treatment is initiated with a low temperature and the treatment temperature is elevated thereafter, the heat resistance of the porous film gradually improves with the progress of crosslinking in the film. It is therefore possible to expose the film to high temperatures while preventing original properties of the film, such as air permeability, from being impaired by the heating. Consequently, the multistage or temperature-rising heat treatment method is preferred from the standpoint of completing the heat treatment in a short time period without impairing film properties.

In the multistage heat treatment method, the temperature for the first heat treatment step is preferably 40-90° C. although it depends on the composition of the porous film. The temperature for the second heat treatment step is preferably 90-140° C. although it depends on the composition of the porous film.

In the case of using ultraviolet, a crosslinking treatment of the porous film obtained through film formation can be conducted by irradiating the porous film, without any treatment, with ultraviolet in the air using a mercury lamp, or by immersing the porous film in, e.g., a methanol solution of a polymerization initiator, drying the film to remove the solvent, and then irradiating this film with ultraviolet using a mercury lamp. It is also possible to conduct the ultraviolet irradiation in water for the purpose of temperature control during the irradiation.

In the case of using electron rays, the porous film obtained through film formation is irradiated in a radiation dose of, for example, 0.1-10 Mrad to conduct the treatment. The atmosphere for the irradiation may be air, as in the heat treatment methods, or may be an inert gas atmosphere such as nitrogen gas or argon gas so as to control crosslinking.

Subsequent to the crosslinking step, the porous film may generally be subjected to heat setting (thermal fixing) for the purpose of preventing thermal shrinkage. Especially in the present invention, when a crosslinking treatment is conducted with heat as described above, the porous film can be substantially heat-set under some treatment conditions. However, in the case where this heat setting is insufficient, the porous film which has undergone the crosslinking treatment may be further heated for heat setting in order to more effectively prevent thermal shrinkage. This heat setting may be conducted at a temperature of, e.g., 110-140° C. for a period of about 0.5-2 hours.

The thickness of the porous film of the present invention is desirably 1-60 μm, preferably 5-50 μm. The air permeability thereof, as measured, for example, by the method in accordance with JIS P8117, is desirably 100-1,000 sec/100 cc, preferably 100-900 sec/100 cc. The shutdown temperature thereof is desirably 150° C. or lower, preferably 145° C. or lower. Furthermore, the porous film of the invention has a reduced TD stretch ratio and, despite this, satisfies high-strength performance. The piercing strength of the film is preferably 2 N/25 μm or higher, more preferably 3 N/25 μm or higher. The shrinkage force of the film has a peak at a temperature not lower than the shutdown temperature of the film, and the peak TD shrinkage force is 80 N/cm$^2$ or lower, preferably 60 N/cm$^2$ or lower. An example of shrinkage force curves is shown in FIG. 1.

The degree of MD shrinkage at 120° C., which is not higher than the melting point, is regulated so as to be lower than the degree of TD shrinkage at 120° C. due to the properties obtained by orientation. The porous film of the present invention having such properties is usable as a separator for non-aqueous electrolyte cells which is excellent in TD shape retention and resistance to film breakage at high temperatures. In this application, the film is expected to further improve the safety of cells of various sizes for various uses.

Cell

Like separators heretofore in use, the porous film of the present invention can be used so as to be interposed between a positive electrode and a negative electrode to fabricate a non-aqueous electrolyte cell. In this fabrication, the materials of the positive electrode, negative electrode, cell case, electrolyte, etc. and the arrangement of these components are not particularly limited and may be the same as in related-art techniques. For example, the materials and the component arrangement may be the same as those shown in JP-A-63-205048.

Materials for use in producing a lithium ion secondary cell as a non-aqueous electrolyte cell will be explained below in detail. The separator for the lithium ion secondary cell preferably is one which does not suffer short-circuit breakage in at least 10 minutes in a 150° C. hot-box test. The positive electrode is constituted of an active material which occludes/releases lithium ions, a binder, and a current collector. A method generally used for producing the positive electrode comprises dissolving a binder in a solvent, mixing the active material therewith to prepare a paste, applying the paste to a current collector, and then drying the coated collector to remove the solvent. There are cases where the drying is followed by a pressing step.

Examples of the active material include various known compounds. Specific examples thereof include lithium-containing transition metal oxides such as $LiCoO_2$, $LiMnO_2$, and $LiNiO_2$, these lithium-containing transition metal oxides in each of which part of the transition metal has been displaced by another transition metal, and chalcogen compounds such as titanium disulfide and molybdenum disulfide.

Examples of the binder include various known resins. Specific examples thereof include fluororesins such as poly(vinylidene fluoride), polyhexafluoropropylene, and polytetrafluoroethylene, hydrocarbon resins such as styrene/butadiene rubbers and ethylene/propylene terpolymers, and mixtures of these. A conductive powder such as carbon black may be added as a conduction aid.

A metal having excellent oxidation resistance is used as the current collector. The metal is preferably aluminum in a foil or mesh form.

The negative electrode is constituted of a carbonaceous active material or lithium-containing alloy, a binder, and a current collector. The binder may be the same as in the positive electrode. The negative electrode can be produced by known methods like the positive electrode. In some cases, the negative electrode may contain a conduction aid like the positive electrode.

Examples of the carbonaceous active material include artificial graphite, natural graphite, burned coke or pitch, and materials obtained by sintering a phenol resin, polyimide, cellulose, or the like. Examples of the lithium-containing alloy include alloys of aluminum, tin, or silicon.

A metal having excellent reduction stability is used as the current collector. Preferable metal is copper in a foil or mesh form.

Examples of the electrolyte include known electrolytes such as an electrolytic solution prepared by dissolving a lithium salt in a nonaqueous solvent, a gel electrolyte containing the electrolytic solution, and a solid electrolyte prepared by dissolving/dispersing a lithium salt in a polymer such as poly(ethylene oxide). Examples of the lithium salt that can be used include lithium borotetrafluoride $LiBF_4$, lithium hexafluorophosphate $LiPF_6$, lithium perchlorate $LiClO_4$, and lithium trifluoromethanesulfonate $LiCF_3SO_3$. Examples of the nonaqueous solvent include solvents such as propylene carbonate (PC), ethylene carbonate (EC), methyl ethyl carbonate (MEC), 1,2-dimethoxyethane (DME) or γ-butyrolactone (γ-BL), and mixed solvents comprising two or more of these.

The cell of the present invention is a cell employing the porous film of the present invention, which has a low TD shrinkage force and excellent heat resistance. Examples of the cell include solar cells and fuel cells besides non-aqueous electrolyte cells represented by the lithium ion secondary cell described above.

In general, a dye sensitization type solar cell comprises a porous thin-film electrode containing nano-size titanium oxide having a dye chemically adsorbed thereon and an electrolyte as described, e.g., in a document (Shuji Hayase, Shikiso Zôkan Taiyô Denchi No Kenkyû Kaihatsu Dôkô, Switching Power Source/Battery System Symposium 2003). A frame spacer has been used for insulation between the electrodes. However, use of the porous film easily enables the electrolyte layer to have a reduced and more even thickness and a larger area and thus contributes to an improvement in output. Furthermore, upon impregnation with an electrolyte, the porous film becomes transparent and comes to transmit light necessary for reaction. The porous film can hence be advantageously used.

A fuel cell employing a polymer as an electrolyte is fabricated by superposing a positive electrode comprising a catalyst layer and a gas diffusion layer and a negative electrode, with a polyelectrolyte film interposed therebetween, as described in, e.g., WO 01/022514. When the porous film of the invention is impregnated with a polyelectrolyte and used as a polyelectrolyte film, then electrolyte layer reinforcement can be reconciled with thickness reduction of the layer and an improvement in output can be attained. Since this porous film has a low TD shrinkage force and shows a frictional force when superposed, it has excellent shape retention even at high temperatures. In addition, the porous film does not melt due to its crosslinked structure and can retain its strength. The film can hence be advantageously used.

Furthermore, the porous film of the invention can be used, like separators heretofore in use, so as to be interposed between a pair of electrodes to fabricate a capacitor. In this fabrication, the materials of the electrodes, electrolyte, case, etc. and the arrangement of these components are not particularly limited and may be the same as in related-art techniques. For example, an active-carbon electrode produced using PTFE as a binder and a solution prepared by adding 0.5 M $Et_4PBF_4$ to propylene carbonate can be used as each electrode and the electrolyte, respectively, in fabricating an electric double-layer capacitor.

The present invention will be explained in more detail by reference to the following Examples and Comparative Examples, but the invention should not be construed as being limited to these Examples. Various properties were measured in the following manners.

Weight-Average Molecular Weight

Gel permeation chromatograph "GPC-150C", manufactured by Waters Inc., is used to conduct a measurement at 135° C. using o-dichlorobenzene as a solvent and "Shodex-80M", manufactured by Showa Denko K.K., as a column. Data processing is conducted with a data collection system produced by TRC. The molecular weight is calculated for standard polystyrene.

Film Thickness

Measured with a 1/10,000 thickness gauge.

Porosity

A disk having a diameter of 6 cm is cut out of a porous film to be examined, and the volume and weight thereof are determined. The porosity is calculated from the results using the following equation.

Porosity (vol %)=100×(volume ($cm^3$)−weight (g)/ average density of resin (g/$cm^3$))/volume ($cm^3$)

Air Permeability (Gurley value)

Measured in accordance with JIS P8117.

Shutdown Temperature

A cell made of SUS was used which had a 25 mm diameter cylindrical test chamber capable of being closed. Platinum plates (thickness, 1.0 mm) respectively having diameters of 20 mm and 10 mm were used as a lower electrode and an upper electrode, respectively. A test sample cut into a size of 24 mm diameter was impregnated with an electrolyte by immersion therein and sandwiched between the electrodes, and this assemblage was set in the cell. To the electrodes was applied a given areal pressure with a spring attached to the cell. The electrolyte used was a solution prepared by dissolving lithium borofluoride in a concentration of 1.0 mol/l in a solvent prepared by mixing propylene carbonate and dimethoxyethane in a ratio of 1:1 by volume.

A thermoelectric thermometer and a resistance meter were connected to the cell so that the temperature and resistance could be measured. This cell was placed in a 180° C. thermostatic chamber to measure the temperature and resistance. The average heating rate in heating from 100° C. to 150° C. was 10° C./min. In this measurement, the temperature at which the resistance reached 100 $\Omega \cdot cm^2$ was taken as the shutdown temperature.

Penetration Strength

A penetration test was conducted with compression tester "KES-G5", manufactured by Kato Tech Co., Ltd. The maximum load was read off on the load curve obtained and was taken as the penetration strength. The needle used had a diameter of 1 mm and a radius of curvature of the tip of 0.5 mm. The needle was caused to penetrate at a rate of 2 cm/sec. The value obtained was converted to strength in the unit N/25 μm by multiplying it by a thickness proportion.

MD/TD Shrinkage Ratio

A rectangular sample cut out so as to have an MD dimension of 60 mm and a TD dimension of 40 mm was held for 1 hour in a 120° C. thermostatic drying oven. Thereafter, the sample was taken out thereof and the sample dimensions in the MD and TD were then measured. The degrees of shrinkage were determined using the following equations.

Degree of shrinkage (MD)=100×(60−$L1$)/60 wherein L1 is the MD dimension (mm) after shrinkage.

Degree of shrinkage (TD)=100×(40−$L2$)/40 wherein L2 is the TD dimension (mm) after shrinkage.

The MD/TD shrinkage ratio was determined using the following equation.

MD/TD shrinkage ratio=degree of shrinkage (MD)/degree of shrinkage (TD)

Shrinkage Force

Figure 2:
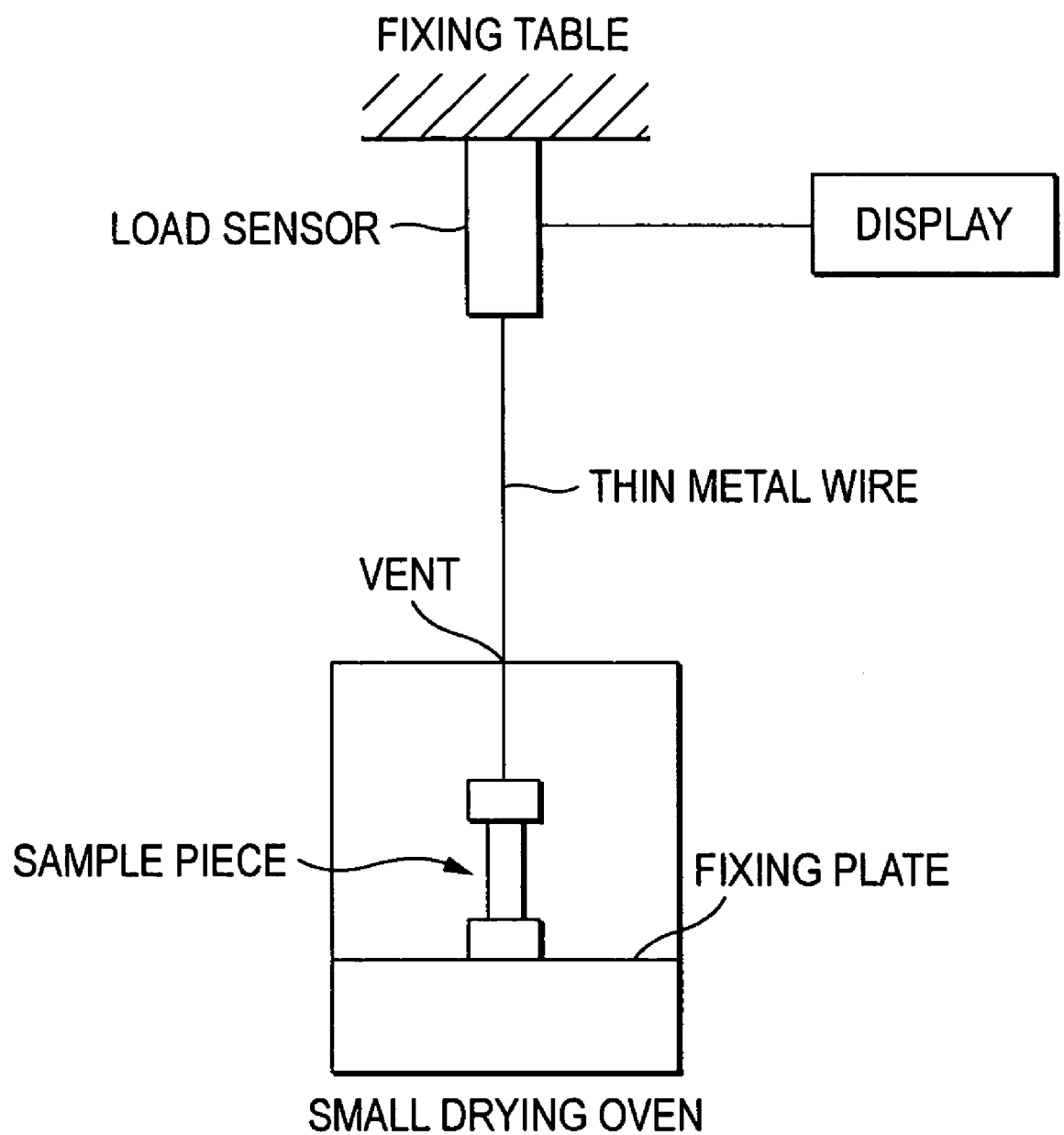
FIG. 2 is a diagrammatic view illustrating the constitution of an apparatus for use in measuring TD shrinkage force.

A strip-form sample having a width of 10 mm was cut out in the TD. This sample was attached to chucks with a chuck-to-chuck distance of 30 mm. The lower chuck was placed on the bottom of a non-air-circulating electric heating/drying oven set at 170° C., while the upper chuck was suspended from a digital force gauge (FGC-02, manufactured by NIDEC-SBIMPO Corp.). The load at which the sample began to slacken was set at 0 mN, and heating was conducted (see FIG. 2). This operation gives a temperature rising curve as shown in FIG. 1. The average rate of heating from 130° C. to 150° C. is 2° C./min. The value at the peak around 140° C. was read off and taken as the shrinkage force. This value was divided by the sectional area of the sample to thereby calculate the shrinkage force per unit area (unit: N/$cm^2$).

Hot Box Test

A cell was fitted into a case having terminals capable of retaining the state of being pressed against the positive and negative electrodes of the cell. The case including the cell and a thermocouple were placed in a closed vessel made of SUS and equipped with a lockable lid, and the lid was locked. This closed vessel was placed in a hot-air drying oven to forcedly heat the cell. The drying oven was set so that the temperature in the closed vessel was elevated to 150° C. over about 30 minutes. After the temperature in the vessel reached 150° C., this temperature was maintained and the internal resistance of the cell was examined for change with an alternating resistance meter. The time period required for the electrical resistance to drop abruptly (internal short-circuiting) after the temperature reached 150° C. was measured and this period was taken as retention time.

Ascertainment of Crosslinked Structure

The absorption peak (960 $cm^{-1}$) attributable to C=C double bonds in an IR spectrum was ascertained to disappear. Furthermore, a sample 10-mm square was sandwiched between metal meshes and dissolved in hot xylene (255° C.), and the proportion of components remaining undissolved was determined as a gel content. This value was compared with the gel content (usually 0%) of the porous film which had not undergone any heat treatment.

EXAMPLE 1

Twenty parts by weight of a polymer composition consisting of 3% by weight polynorbornene resin (Norsorex NB, manufactured by Nippon Zeon Co., Ltd.), 16% by weight thermoplastic olefin elastomer (TPE821, manufactured by Sumitomo Chemical Co., Ltd.), and 81% by weight ultra-high-molecular polyethylene having a weight-average molecular weight of 1,000,000 (melting point, 137° C.) was evenly mixed with 80 parts by weight of liquid paraffin to prepare a slurry mixture. This mixture was melted/kneaded with a twin-screw extruder at a temperature of 160° C. and extruded into a sheet having a thickness of 8 mm with a flat die suitable for MD orientation. This extrudate was taken off under constant tension, temporarily cooled by immersion in a −10° C. antifreeze liquid, and then molded into a 1-mm sheet with a belt press having a set temperature of 130° C. This sheet obtained through rolling had a width three times the original width. This sheet was subjected to simultaneous biaxial stretching at a temperature of 120° C. in stretch ratios of 5 and 4.5 in the MD and TD, respectively, to thereby obtain a film. The stretched film was subjected to a solvent removal treatment with heptane. Thereafter, the porous film obtained was heat-treated at 85° C. for 6 hours in air and then heat-treated at 115° C. for 2 hours to obtain a porous film according to the invention. From IR and gel content analyses, this porous film was ascertained to have a crosslinked structure. The porous film obtained was evaluated for properties. In a shrinkage force measurement (set temperature, 170° C.), the film neither melted nor broke even at 165° C., which was higher than the melting point of the main material. Subsequently, this porous film was used to fabricate a cell.

Positive Electrode

Eighty-nine parts by weight of lithium-cobalt oxide (LiCoO$_2$) was mixed with 5 parts by weight of acetylene black, 6 parts by weight of PVDF, and 90 parts by weight of NMP to obtain a positive-electrode mix slurry. This positive-electrode mix slurry was passed through a 70-mesh screen to remove solid particles having a large diameter. Thereafter, the slurry was evenly applied to each side of a positive-electrode current collector consisting of an aluminum foil having a thickness of 20 μm. The current collector coated was dried and then pressed to obtain a positive electrode. In this Example, the coated area (W1×W2) of the positive electrode was 55×35 mm$^2$.

Negative Electrode

Ninety-five parts by weight of a powder of graphitized mesocarbon microbeads (MCMB, manufactured by Osaka Gas Chemical; d(002)<0.34 nm) was mixed with 5 parts by weight of PVdF and 110 parts by weight of N-methylpyrrolidone (NMP) to obtain a negative-electrode mix slurry. This slurry was applied to one or each side of a negative-electrode current collector consisting of a copper foil having a thickness of 18 μm. The current collector coated was dried and then pressed to obtain a negative electrode. The coated area (W1×W2) of the negative electrode was 56×36 mm$^2$.

The positive and negative electrodes each had current collection parts uncoated with the active material.

Fabrication of Cell

Six pieces of the positive electrode obtained above and five pieces of the negative electrode obtained above (two of which were one-side electrodes) were alternately superposed together with the porous film of the present invention (57 mm in TD by 40 mm in MD) interposed therebetween to form an electrode assemblage. The 2-mm MD marginal parts of the separators (i.e., each separator had a 2-mm margin on each side because the porous-film dimension was 40 mm, while the electrode dimension was 36 mm) were heat-sealed. The positive-electrode lugs and negative-electrode lugs in the electrode assemblage obtained were welded to respective tabs (positive electrode: aluminum, negative electrode: nickel). A solution prepared by dissolving lithium borofluoride in a concentration of 1 mol/l in a solvent prepared by mixing ethylene carbonate, diethylene carbonate, and methyl ethyl carbonate in a ratio of 1/2/1 by weight was infiltrated as an electrolytic solution into the electrode assemblage. Thereafter, an aluminum/resin laminate film having a thickness of 0.11 mm (aluminum layer, 0.02 mm) was used as a casing material to vacuum-seal the electrode assemblage at a reduced pressure (0.1 atm). Thus, a cell was obtained.

This cell was charged at a current of 0.2 C to 4.2 V and a constant voltage of 4.2 V was then applied. This constant-current constant-voltage charge was conducted for 5 hours in total.

Hot-Box Test

The cell thus charged to 4.2 V at room temperature was subjected in the charged state to the hot-box test. The period from the time when the temperature of the cell periphery reached 150° C. to the time when internal short-circuiting was observed in the cell was measured. The results obtained are shown in Table 1 together with properties of the porous film.

EXAMPLE 2

Twenty parts by weight of a polymer composition consisting of 10% by weight EPDM resin (Esprene 553, manufactured by Sumitomo Chemical Co., Ltd.), 20% by weight high-density polyethylene having a weight-average molecular weight of 200,000, and 70% by weight ultrahigh-molecular polyethylene having a weight-average molecular weight of 1,000,000 was evenly mixed with 80 parts by weight of liquid paraffin to prepare a slurry mixture. This mixture was melted/kneaded with a twin-screw extruder at a temperature of 160° C. and extruded into a sheet. This extrudate was temporarily cooled and then molded into a 1-mm sheet with a continuous press having a set temperature of 130° C. This sheet was subjected to simultaneous biaxial stretching at a temperature of 120° C. in stretch ratios of 6 and 4 in the MD and TD, respectively, to thereby obtain a film. The stretched film was subjected to a solvent removal treatment with heptane. Thereafter, the porous film obtained was heat-treated at 85° C. for 6 hours in air and then heat-treated at 110° C. for 3 hours to obtain a porous film according to the invention. From IR and gel content analyses, this porous film was ascertained to have a crosslinked structure. The porous film obtained was evaluated for properties. In a shrinkage force measurement (set temperature, 170° C.), the film neither melted nor broke even at 165° C., which was higher than the melting point of the main material. Subsequently, this porous film was used to fabricate a cell in the same manner as in Example 1, and the cell was subjected to the hot-box test.

EXAMPLE 3

A porous film according to the invention was obtained in the same manner as in Example 1, except that simultaneous biaxial stretching was conducted at a temperature of 123° C. in stretch ratios of 7 and 3.5 in the MD and TD, respectively. From IR and gel content analyses, this porous film was ascertained to have a crosslinked structure. The porous film obtained was evaluated for properties. In a shrinkage force measurement (set temperature, 170° C.), the film neither melted nor broke even at 165° C., which was higher than the melting point of the main material. Subsequently, this, porous film was used to fabricate a cell in the same manner as in Example 1, and the cell was subjected to the hot-box test.

EXAMPLE 4

A porous film according to the invention was obtained in the same manner as in Example 1, except that simultaneous biaxial stretching was conducted at a temperature of 127° C. in stretch ratios of 8 and 3 in the MD and TD, respectively. From IR and gel content analyses, this porous film was ascertained to have a crosslinked structure. The porous film obtained was evaluated for properties. In a shrinkage force measurement (set temperature, 170° C.), the film neither melted nor broke even at 165° C., which was higher than the melting point of the main material. Subsequently, this porous film was used to fabricate a cell in the same manner as in Example 1, and the cell was subjected to the hot-box test.

COMPARATIVE EXAMPLE 1

A porous film was obtained in the same manner as in Example 1, except that simultaneous biaxial stretching was conducted at a temperature of 125° C. in stretch ratios of 3.5 and 7 in the MD and TD, respectively. The porous film obtained was evaluated for properties. In a shrinkage force measurement (set temperature, 170° C.), the film neither melted nor broke even at 165° C., which was higher than the melting point of the main material. Subsequently, this porous film was used to fabricate a cell in the same manner as in Example 1, and the cell was subjected to the hot-box test.

COMPARATIVE EXAMPLE 2

A porous film having no crosslinked structure was obtained in the same manner as in Example 1, except that the polynorbornene resin was omitted. The porous film obtained was evaluated for properties. In a shrinkage force measurement (set temperature, 170° C.), the film melted and broke at 145° C. Subsequently, the porous film was used to fabricate a cell in the same manner as in Example 1, and the cell was subjected to the hot-box test.

The properties of the separators obtained in the Examples and Comparative Examples given above are shown in the Table below.

150° C., but also have reduced TD shrinkage force, which inhibits the electrodes from being exposed. It is thought that high safety was attained due to these properties.

It should further be apparent to those skilled in the art that various changes in form and detail of the invention as shown and described above may be made. It is intended that such changes be included within the spirit and scope of the claims appended hereto.

What is claimed is:

1. A porous film comprising a crosslinked material of a resin composition containing (a) 1-50% by weight of polynorbornene, (b) 1-50% by weight of a thermoplastic elastomer, and (c) 5-98% by weight of an ultra-high molecular polyolefin resin having a weight average molecular weight exceeding 500,000, the porous film stretched in a machine direction (MD) and a transverse direction (TD), wherein the film has a peak of shrinkage force in the TD at a temperature region of a shutdown temperature of the film or higher, and the shrinkage force as measured at the peak is 63 N/cm$^2$ or lower, wherein the MD stretch ratio/the TD stretch ratio is from 1.5 to 3.5.

2. The porous film of claim 1, which has degrees of shrinkage after 1-hour heating at 120° C. satisfying the relationship: degree of machine-direction (MD) shrinkage<degree of transverse-direction shrinkage.

3. The porous film of claim 1, which has a penetration strength of 3 N/25 μm or higher.

4. The porous film of claim 1, wherein the ultrahigh-molecular polyolefin resin has a weight-average molecular weight of 1,000,000 or higher.

5. A film for maintaining electrical insulation, comprising the porous film of claim 1.

6. A separator for non-aqueous electrolyte cells, comprising the porous film of claim 1.

7. The separator of claim 6, which is a separator for lithium ion secondary cells and does not suffer short-circuit breakage in at least 10 minutes in a 150° C. hot-box test.

8. A cell using the porous film of claim 1 as a film for maintaining electrical insulation.

TABLE

| Unit | Film thickness μm | Porosity % | Air Permeability sec/100 ml | Penetration strength N/25 μm | MD/TD shrinkage ratio | SD temperature ° C. | Shrinkage force N/cm$^2$ | Retention time min |
|---|---|---|---|---|---|---|---|---|
| Ex. 1 | 16 | 41 | 220 | 9.2 | 0.56 | 134 | 75 | 13 |
| Ex. 2 | 16 | 37 | 300 | 9.2 | 0.44 | 133 | 63 | 25 |
| Ex. 3 | 16 | 39 | 260 | 8.0 | 0.40 | 133 | 47 | 65 |
| Ex. 4 | 15 | 37 | 310 | 6.6 | 0.37 | 133 | 33 | 150 |
| Comp. Ex. 1 | 16 | 40 | 270 | 9.5 | 0.8 | 134 | 91 | 5 |
| Comp. Ex. 2 | 16 | 42 | 200 | 9.4 | 0.53 | 134 | 70 | 2 |

The results given in the Table above show that the lower the TD shrinkage force, the longer the retention time in the hot-box test and the higher the safety. The porous films according to the present invention not only have high heat resistance which enables the films to withstand a high temperature of 9. The cell of claim 8, which is a lithium ion cell.

10. A capacitor using the porous film of claim 1 as a film for maintaining electrical insulation.

* * * * *